RECORDING APPARATUS

Filed July 7, 1955

INVENTORS
JOHN N. STREET
WILLIAM F. HAMILTON
BY Raymond Wolton
ATTORNEY

United States Patent Office 2,921,125

Patented Jan. 12, 1960

2,921,125

RECORDING APPARATUS

John N. Street, Washington, D.C., and William F. Hamilton, Rockville, Md., assignors to Reed Research, Inc., Washington, D.C., a corporation of Delaware Application July 7, 1955, Serial No. 520,456

4 Claims. (Cl. 178—6.6)

This invention relates to recording apparatus wherein the amplitude of a signal can be represented as an intensity variation on a recording medium.

In a preferred embodiment, a signal sensed by a moving coil movement of the d'Arsonval type, deflects a stylus whose movement will be a function of the signal amplitude.

It is among the objects of the present invention to provide recording apparatus for providing a record of the density of an object, visual characteristics of each portion of said record being a function of the density of corresponding portions of said object, comprising a work support for supporting said object, record means, a record support for supporting said record means, a signal generator for producing pulses of sonic energy for transmission through said object, said pulses being modulated in accordance with the density of said object, a transducer responsive to said pulses of sonic energy from said signal generator passing through said object for producing output signals modulated in accordance with the density of said object in the region through which said pulses of sonic energy have passed, a stylus cooperating with the surface of said record means to produce a trace line thereon, driving means for systematically changing the relative position of said transducer with respect to said object and for systematically changing the relative position of said stylus with respect to said record means so that said object and said record means are similarly scanned in normal trace paths by said transducer and stylus, respectively, said stylus having deflecting means, and a circuit including said transducer and said deflecting means for energizing said deflecting means to deflect said stylus from its normal trace path by a distance which varies in accordance with the modulations of said modulated output signals.

The driving means may impart rotary motions to the work and record supports and rectilinear motion to the carriage. The signal source preferably comprises a transmitting transducer spaced from the signal responsive transducer to receive a work piece between them for inspection, the sensing circuit transducer preferably being in circuit with an amplifier to supply the stylus winding with sufficient energy to produce an intelligible record. A pulse generator connected in circuit with the transmitting transducer will preferably produce a wave having its nodes in adjacent trace paths relatively displaced to assure an increased number of intersections on the record corresponding to higher signal amplitudes.

Figure 1:
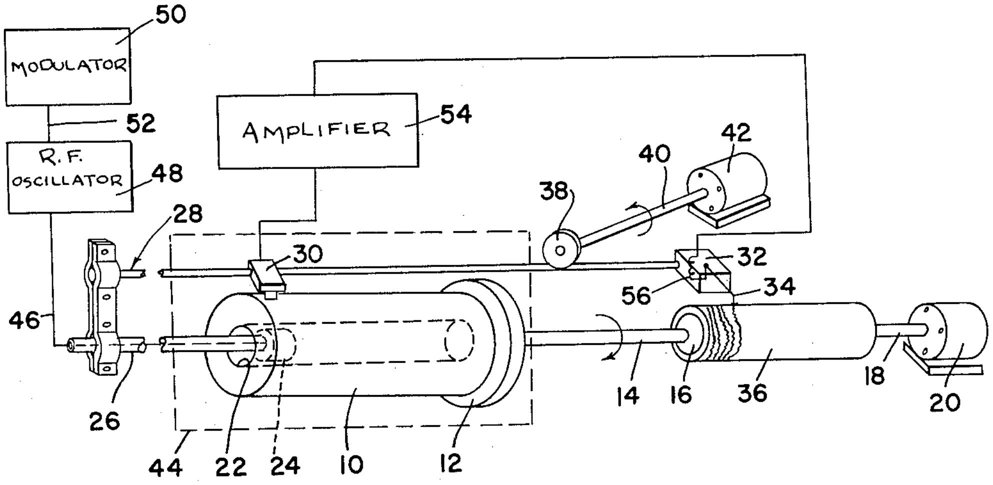
Figure 2:
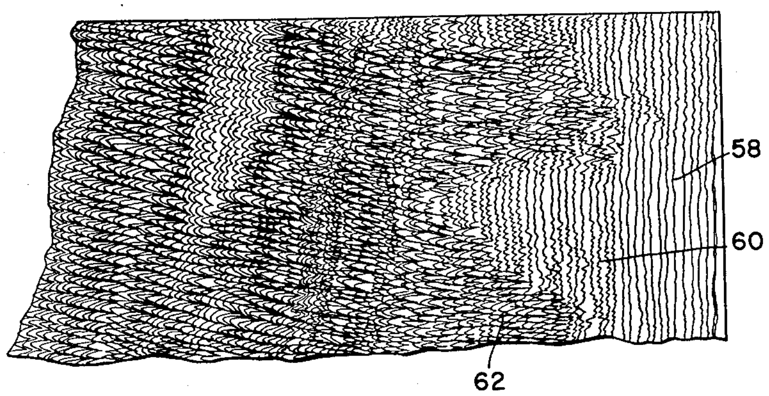

Whereas the invention is applicable to the testing of a wide variety of forms and materials with different types of signal sources and transducers, it has been illustrated as applied to the detection of cracks and porous regions in hollow cylindrical propellant grains in the accompanying drawing wherein:

Fig. 1 is a diagrammatic showing of one form of apparatus and circuit contemplated; and Fig. 2 is a fragmentary representation of a record produced therewith.

A work piece 10 is suitably carried by a work support 12 coupled by means of a shaft 14 with a recorder drum 16 adapted for rotation through a shaft 18 by a driving motor 20.

The work piece 10 is shown as a hollow cylinder whose axial opening 22 receives a signal transmitting transducer 24 mounted on a rod or tube 26 forming part of a carriage 28 which supports another transducer 30 supported externally of the work piece for sensing signals from the transmitting transducer 24, and a stylus assembly 32 carrying a stylus 34 for cooperation with a record sheet 36 mounted on the drum 16. Rectilinear movement is imparted to the carriage, its transducers and stylus assembly by means of a friction wheel or gear 38 secured to the shaft 40 of a motor 42, the relative speeds of movement and dimensions of the record drum determining the spacing or interval between adjacent paths or lines traced by the stylus on the record.

The transducers 24 and 30 as well as the work piece 10 are immersed in a liquid such as water, diagrammatically represented by the broken line enclosure 44 to provide a low loss coupling for the ultrasonic frequency oscillations utilized in operating the equipment.

The transducer 24 is energized by a suitable number of conductors 46 from a radio frequency oscillator 48 connected to a modulator 50 through a suitable number of leads 52. Signals from the transducer 24 transmitted through the work piece 10 are received by the sensing transducer 30, fed to the amplifier 54 and applied to the winding 56 of the stylus assembly 32. It is important that deflection of the stylus 34 in at least one direction be capable of exceeding the spacing or interval between adjacent trace paths so that in areas of high signal amplitudes there will be numerous intersections on the record and therefore a higher density thereof. Deflections of up to five times the trace interval can be expected to produce highly satisfactory records.

The record sheet 36 may be an electro-sensitive medium such as "Teledeltos" paper upon which the stylus 34 will produce markings having an intensity variation proportional to the amplitude of the signals sensed by the transducer 30. The modulator 50 produces low frequency voltage pulses which may be of the order of 60 pulses per second, and having a duty cycle of approximately 50%. The frequency is preferably selected relative to the record and stylus relationships so that the nodes in adjacent trace paths will be relatively displaced to assure an increased number of intersections on the record corresponding to higher signal amplitudes.

Thus it will follow, that since the movements of the work piece and the record drum are similar and the movements of the transducers and stylus assembly are likewise similar, a very accurate representation of the composition of the work piece will be produced on the record sheet 36 which can be removed from the drum 16 in either its cylindrical form or peeled therefrom as a sheet to constitute a permanent record of the characteristics of the article undergoing inspection. Inasmuch as the displacements of the stylus 34 over the record sheet 36 will be greater in regions of increased transmission through the work piece, because of the larger pulse voltage applied to the stylus winding 56, the record will be variable in density, as clearly illustrated in Fig. 3, to correspond with variations in the transmission characteristics of the work piece.

An examination of the fragmentary record chart will reveal the wide range of densities or intensities obtained. Substantially zero signal is indicated by the zone 58 where adjacent trace paths are substantially straight lines. Undulations substantially equal in amplitude to the trace interval appear in the zone 60. When amplitudes increase to values causing deflections exceeding the trace interval as in zone 62, the intersections of the trace paths occur and increasing density of the record occurs until almost complete opacity is reached, as at the extreme left portion of Fig. 2, indicative of high signal strength. In addition to providing approximate amplitude information at a glance, these variable density records permit a very precise determination of signal strength by measurement of the stylus excursion at any particular point.

Whereas only one specific form of the invention has been illustrated and described, other variations are contemplated as falling within the scope of the appended claims.

We claim:

1. Recording apparatus comprising a signal source, a work support and a record support, a carriage supporting a transducer responsive to signals from said source for scanning a work piece carried by said work support, a stylus having an energizing winding mounted on said carriage for scanning a record carried by said record support, driving means for imparting similar motions to said work and record supports in one direction and similar scanning motions to said carriage, transducer and stylus in another direction to produce adjacent trace paths having a predetermined interval, and a circuit including said transducer and said stylus winding, said stylus having a deflection range in one direction exceeding the predetermined interval of said trace path to produce a record whose density is a function of the amplitude of said signals.

2. Recording apparatus for providing a record of the density of an object, the visual characteristics of each portion of said record being a function of the density of corresponding portions of said object, comprising a work support for supporting said object, record means, a record support for supporting said record means, a signal generator for producing pulses of sonic energy for transmission through said object, said pulses being modulated in accordance with the density of said object, a transducer responsive to said pulses of sonic energy from said signal generato: passing through said object for producing output signals modulated in accordance with the density of said object in the region through which said pulses of sonic energy have passed, a stylus cooperating with the surface of said record means to produce a trace line thereon, driving means for systematically changing the relative position of said transducer with respect to said object and for systematically changing the relative position of said stylus with respect to said record means so that said object and said record means are similarly scanned in normal trace paths by said transducer and stylus, respectively, said stylus having deflecting means, and a circuit including said transducer and said deflecting means for energizing said deflecting means to deflect said stylus from its normal trace path by a distance which varies in accordance with the modulations of said modulated output signals.

3. Recording apparatus as set forth in claim 2 wherein the deflection distance of said stylus has a range in one direction from said normal trace path sufficient to cross at least two other portions of said normal trace path.

4. Recording apparatus as set forth in claim 2 wherein said record means is a surface having the same geometrical configuration as the external surface of said object.

References Cited in the file of this patent

UNITED STATES PATENTS

| | | |
|---|---|---|
| 2,297,319 | Parr | Sept. 29, 1942 |
| 2,440,970 | Palmer | May 4, 1948 |
| 2,524,208 | Piper | Oct. 3, 1950 |
| 2,572,550 | White | Oct. 23, 1951 |
| 2,573,390 | Blanchard | Oct. 30, 1951 |
| 2,587,414 | Valkenburg | Feb. 26, 1952 |
| 2,705,259 | Lant | Mar. 29, 1955 |